(12) United States Patent
Laksono et al.

(10) Patent No.: US 6,339,427 B1
(45) Date of Patent: Jan. 15, 2002

(54) GRAPHICS DISPLAY LIST HANDLER AND METHOD

(75) Inventors: Indra Laksono, Richmond Hill; Antonio Asaro, Scarborough, both of (CA)

(73) Assignee: ATI International SRL, Christ Church (BB)

(*) Notice: Subject to any disclaimer, the term of this patent is extended or adjusted under 35 U.S.C. 154(b) by 0 days.

(21) Appl. No.: 09/211,637

(22) Filed: Dec. 15, 1998

(51) Int. Cl.[7] ............................................. G06T 15/00
(52) U.S. Cl. ...................... 345/553; 345/558; 345/565
(58) Field of Search .............................. 345/501–503, 345/520, 522, 537, 543, 553, 558, 565

(56) References Cited

U.S. PATENT DOCUMENTS

| | | | | |
|---|---|---|---|---|
| 5,301,287 A | * | 4/1994 | Herrell et al. | 711/202 |
| 5,329,615 A | * | 7/1994 | Peaslee et al. | 395/502 |
| 5,371,849 A | * | 12/1994 | Peaslee et al. | 345/553 |
| 5,657,479 A | * | 8/1997 | Shaw et al. | 345/526 |
| 5,805,905 A | * | 9/1998 | Biswas et al. | 710/244 |
| 5,835,779 A | * | 11/1998 | Chang et al. | 710/268 |
| 5,856,829 A | * | 1/1999 | Gray, III et al. | 345/422 |
| 5,953,020 A | * | 9/1999 | Wang et al. | 345/513 |
| 6,092,124 A | * | 7/2000 | Priem et al. | 710/23 |
| 6,108,014 A | * | 8/2000 | Dye | 345/507 |
| 6,192,428 B1 | * | 2/2001 | Abramson et al. | 710/52 |

* cited by examiner

*Primary Examiner*—Ulka J. Chauhan
(74) *Attorney, Agent, or Firm*—Vedder, Price, Kaufman & Kammholz

(57) ABSTRACT

A graphics display command list handler and method requests allocation of memory, such as system memory, in the form of a circular FIFO which stores the display command list as a memory display list (MDL), such as a host memory display list. A processor, such as a graphics processor, communicates a host memory display list read pointer to the host processor to facilitate display list signaling by the graphics processor. The host processor (or other processor) maintains a write pointer which points to a last host memory entry in the display list. The read pointer is maintained by the graphics processor and written back to the host processor.

19 Claims, 3 Drawing Sheets

GRAPHICS DISPLAY LIST HANDLER AND METHOD

FIELD OF THE INVENTION

The invention relates generally to graphics processors and more particularly to graphics devices employing display command list handling mechanisms with another processor, such as a host processor.

BACKGROUND OF THE INVENTION

The programming of devices such as graphics processors across a multipurpose bus, such as PCI buses is becoming a bottleneck for proper graphics rendering or image generation mechanisms. Push architectures which typically have the host processor push commands to the graphics processor as a result of burstiness of the workload over multipurpose buses causes the host processor to waste time waiting to send commands. Hence, it would be desirable to have a different type of architecture that facilitates concurrency of processing between a host processor and a graphics processor chip of graphics related information.

To perform three dimensional rendering of images for multi media applications, games and other applications, a host processor typically perform some of the three dimensional generation tasks while a graphics processor or graphics chip performs the majority of the processing intensive mathematical computations. It is important in graphics generation systems to efficiently utilize a host processor's processing time since the host processor typically has many other functions to perform aside from generating 2D or 3D graphics images. Similarly, it is desirable to maximize the efficiency of the graphics processor to reduce costs and increase operational speeds. Also, a three dimensional graphics imaging pipeline, for example, may have a graphics processor perform basically all of the rendering and transformation functions. For example, a graphics processor may generate all of the pixels necessary to make an image appear in three dimensions including lighting and texturing and other surface rendering in addition to geometry transformations necessary to generate images. The geometry and lighting aspects of three dimensional imaging typically continuously takes large amounts of host processing time. To overcome, the burden on host processors, some known systems may, for example, use a separate chip to carryout the geometry transformations and another separate chip to perform the rendering operations due to the high processing loading requirements in generating three dimensional images. The geometry transformations include, for example, rotating an image and adding the requisite pixel data to make the image appear as though there has been lighting in a room or on the object. The rendering engines typically perform the drawing of the pixels on the screen. Such systems can be quite costly due to the dual chip configuration and operation.

Known systems also have the host processor generate the operational codes or drawing commands for the graphics processor through a software application. These command codes or operational codes are then sent to the graphics processor and stored in a command FIFO whereafter the graphics processor retrieves the command from the command FIFO and performs any requisite rendering operation. However, such systems typically are not able to accommodate high throughput since the command FIFO is typically limited in size. As previously noted, some systems attempt to provide more efficient and faster processing by having the host processor transfer command instructions to the graphics chip FIFO. One method is to use an interrupt based system wherein when the command FIFO is almost full, the graphics controller sends an interrupt to the host processor. The host processor typically has to poll or have other means of accounting for commands without polling the FIFO status. Another method is to have the graphics chip overflow commands from the command FIFO into graphics memory and/or host system memory. A problem arises with these systems because the FIFO can be almost full or almost empty a majority of the time depending upon the workload of the graphics processor. This requires the host processor to poll often, resulting in host processor operational inefficiencies. With the overflow method, large numbers of commands can be required to be stored resulting in costly use of memory.

Other systems are known that provide a display command list (operational codes) in graphics memory. The CPU or host processor pushes the commands and other information the graphics chip, such as after the CPU performs the geometric transformations on the data and then passes the processed transformation information to the graphics processor for rendering. It is desirable to have concurrency of graphics image generation between the host processor and the graphics processor to facilitate more efficient utilization of both host CPU and the rendering unit over long intervals to allow faster creation and rendering of three-dimensional images in less time. However, a problem arises with such systems because the host processor is continuously polling the graphics chip to determine what stage the graphics chip is in with particular data. With the polling system, the host processor typically asks the graphics chip if it can accept additional data for rendering. As such there may be unnecessary idle time for the graphics chip.

Other systems use a display command list in graphics memory instead of a command FIFO. However, writing the display command list in graphics memory uses up video memory which is a scarce resource, particularly when 3D imaging must be accomplished in short periods of time.

Finally, other known display list handlers store the display command list in host memory. The graphics processor is then commanded to obtain the data and process the command list obtained from the system memory. However, in such systems the host processor typically has to tell the graphics processor to get the command list and the host processor has to ask if it can push commands to inform the graphics processor to obtain the list. This again can result in idle time by the graphics chip and unnecessary overhead for the host processor due to the handshaking required to push commands. Currently graphics processors do not generally initiate communication back to the host processor.

Consequently, a need exists for an improved graphics display command list handling system and method that provides a reduction in host processor overhead while allowing a graphics processor to more efficiently obtain the command data to efficiently process graphics information.

DETAILED DESCRIPTION OF A PREFERRED EMBODIMENT OF THE INVENTION

Briefly, a graphics display command list handler and method provides a concurrent command engine. The graphics display command list handler and method requests allocation of memory, such as system memory, in the form of a circular FIFO which stores the display command list as a memory display list (MDL) buffer. A processor, such as a graphics processor, communicates a host memory display list read pointer to the host processor to facilitate display list signaling by the graphics processor. The host processor (or other processor) maintains a write pointer which points to a last host memory entry in the display list. In this way, the graphics processor (e.g., graphic controller chip) is less likely to become idle and the host processor need not waste time handshaking to initiate communication to determine whether the graphics processor requires additional commands from the display command list. The read pointer is maintained by the graphics processor and written back to the host processor.

In one embodiment a programmable command data parser facilitates parsing of different formats of graphics command packets received, for example, for a pixel engine or other source, and stores retrieved register address and data into a command FIFO in the graphics processor for use by a graphics rendering engine. The programmable parser may be programmed through software so that differing packet formats may be accommodated.

Figure 1:
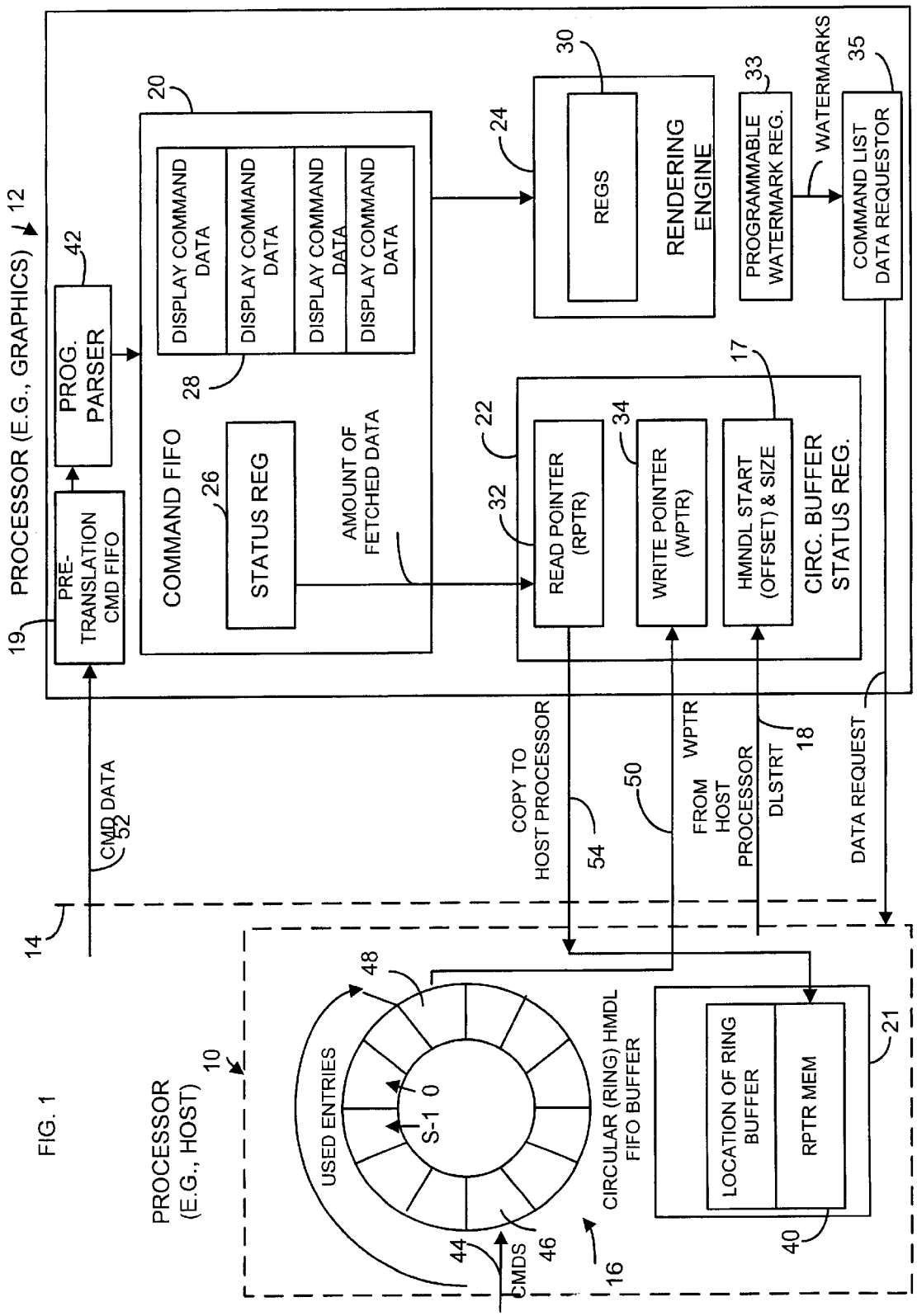
FIG. 1 is a block diagram illustrating one example of a graphics display command list handler in accordance with one embodiment of the invention.

FIG. 1 shows a processor 10, such as a host processor and another processor 12, such as a graphics processor, that communicate information over a bus 14. The processor 12 requests the processor 10 to allocate memory in the form of circular FIFO buffer 16 to store memory display lists (MDL's). For purposes of discussion only, the memory display list will be referred to in the context of a host processor and hence a host memory display list. However, it will be recognized that any suitable processor other than a host processor may be used. The processor 12 also stores memory display list location data and size data, generally indicated at 18 in a HMDL start and size register 17. A command block 21 of system memory is also set aside by the processor 10. The command block 21 contains data relating to the circular HDML FIFO buffer 16 and its status.

The processor 12 includes a pre-command translation FIFO 19, a command FIFO 20 and a circular buffer status register 22, or other suitable memory element, along with a suitable rendering engine 24. The command FIFO 20 includes status register 26 and a series of registers 28 containing data representing display command data obtained from the circular HMDL FIFO buffer 16. The rendering engine 24 obtains the display command data from the command FIFO 20 to determine the appropriate commands to execute for the desired rendering or other operation. The display command data is stored in a rendering engine registers 30. The rendering engine registers, as known in the art, contain parameters for the rendering engine, such as data representing where to start drawing, how tall a triangle is, the slope of the angle of the triangle, the starting colors, and other rendering related information.

The circular buffer status register 22 contains a plurality of registers to facilitate display command list handling. One memory element, such as a read pointer register 32, contains data representing a host memory display list read pointer (RPTR) which indicates a next entry in the circular host memory display list FIFO buffer 16 that is read by the processor 12. Another memory element, such as a write pointer register 34, contains data representing a host memory display list write pointer indicating a next available entry in the circular host memory display list FIFO buffer 16 for the processor 10 to fill or write. The read pointer register 32 contents are communicated from processor 12 to the processor 10 to facilitate display list signaling by the processor 12. As such, the processor 10 also includes a read point register 40 which contains a copy of the host memory display list read pointer.

The pre-command translation FIFO 19 stores command data from the circular HMDL FIFO buffer 16 that has not yet been translated by the parser 42. The processor 12 updates the host memory display list read pointer register 32 based on an amount of command data fetched by the processor 12 from the host memory display list in the circular HMDL FIFO buffer 16. The amount of command data, such as suitably packetized data, fetched is recorded in the status register 26 and is used to determine the next HMDL FIFO buffer read location for the processor 12.

The processor 12 also includes memory 33, and a data requestor 35. The memory 33 contains, for example, a plurality of programmable watermark registers, containing programmable watermarks. The plurality of programmable watermark values facilitate in determining whether to pull ring buffer command data from the HDML. The data requestor requests commands based on a plurality of watermark values. One watermark indicates how many commands are left to retrieve in from the ring buffer. The processor 12, through the data requestor 34 determines whether the differences in value between the host memory display list write pointer data 50 in the write pointer register 34 in the host memory display list and the read pointer 54 in the read pointer register 32 is different than a first watermark value. A second watermark indicates a threshold for when to pull commands based on the number of commands in the pre-translation command FIFO 19. A third watermark is used to indicate when to pull commands for the command FIFO 20 when a set number of entries are available in the command FIFO. Based on whether certain watermarks have been exceeded, the processor 12 obtains the display commands from the circular host memory display list buffer and stores the command data in a command FIFO used by the processor.

For example, if the value of WPTR−RPTR greater than the first watermark, it indicates that there are a lot of commands available in the circular buffer for retrieval and the data requestor begins the process of obtaining commands. The data requestor will continue to get commands (provided they are available) based on the second threshold. The processor 12 determines whether the number of entries in the pretranslation command FIFO is less than the second watermark indicating that the there is room in the pretranslation command FIFO for additional command data. Hence, if there are a lot of commands to retrieve, the processor will fill the pre-translation command FIFO. If there are a few commands to retrieve, (WPTR−RPTR<the first watermark), the processor looks at the command FIFO level and compares this level to the third watermark. If the number of free entries is below the watermark, the data requestor requests data for storage in the command FIFO.

The processor 12 also uses a fourth programmable watermark to determine how often the RPTR should be sent to the host processor. The RPTR is then sent to the host when the watermark is reached or exceeded. This watermark may be set for example to indicate the number of commands after which the RPTR is sent to the host processor. It can also indicate when all desired commands are pulled (e.g., WPTR−RPTR=0). It will be recognized by those of ordinary skill in the art, that the above watermarks may be any suitable value or that they may be eliminated if desired.

The processor 12 also includes a programmable command data parser 42 that receives packets of command data from the circular host memory HMDL FIFO buffer over bus 14. The programmable command data parser 42 parses (i.e., translates) differing graphics command packets to facilitate storing of retrieved register address information and data into the command FIFO 20 for use by the graphics rendering engine 24. The parser translates commands into a native format understood by the rendering engine. The parser 42 is programmable through a graphic user interface or other suitable interface, to select the type of format(s) to translate the command data into.

The processor 10 includes memory, such as system memory configured as the circular (ring) host memory display list FIFO buffer 16. Graphics display commands 44 are stored in entries 46 of the circular FIFO buffer 16. As shown entry 0 is shown as being used. Entry 48 is the entry for which write pointer data 50 indicates a next available entry in the host memory display list. The contents of the entries as previously noted is the command data 52 which is passed to the programmable parser 42 based on the value of the RPTR received from the processor 12. The WPTR points to the last place in the circular HMDL FIFO that the processor 10 wrote. The RPTR is stored in the command block 21. The processor 12, determines the read pointer which is a pointer indicating a next entry to be read in the host memory display list, such as entry 46. The read pointer represents the last read entry by the processor 12, plus one entry. The read pointer data 54 is then also communicated to the processor 10 from processor 12 and stored by processor 10 in a read pointer register 40 in the command block 21. The command block also includes the location of the HMDL ring buffer and any other suitable data.

Figure 2:
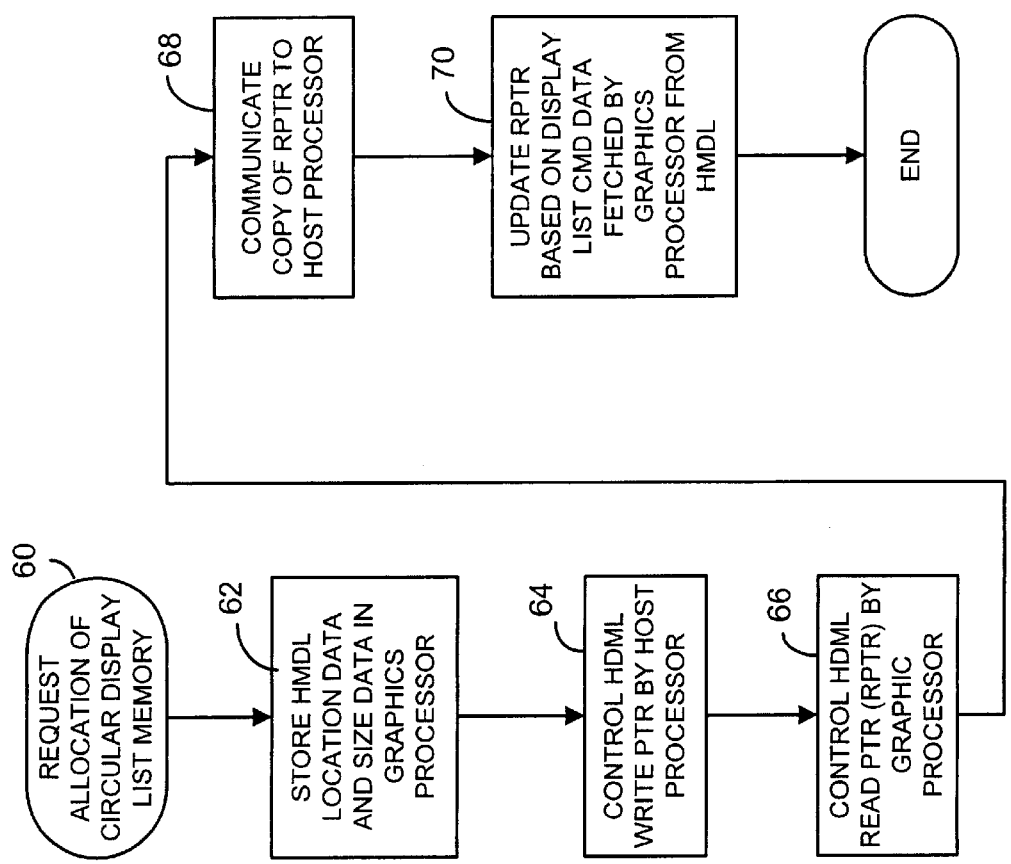
FIG. 2 is a flowchart illustrating one example of the operation of the graphics display command list handler of FIG. 1.

Referring to FIG. 2, in operation, the processor 12 requests allocation by the host processor 10 of the circular display list memory, as shown in block 60. As shown in block 62, the processor 12 stores the HMDL location data and size data such as the display list start and size information 18 as obtained from the host processor 10. As shown in block 64, the processor 10 continually updates the write pointer 50 and communicates the write pointer to the processor 12 for storage in the write pointer register 34.

As shown in block 66, the processor 12 controls the HMDL read pointer data 54 by determining a next entry to be read in the host memory display list. As shown in block 68, the processor 12 facilitates pulling of the command packets from the entries of the circular host memory HMDL FIFO buffer by communicating a copy of the read pointer to the processor 10. As shown in block 70, the processor 12 updates the read pointer based on display list command data fetched by the processor 12 from the HMDL FIFO buffer 16.

Figure 3:
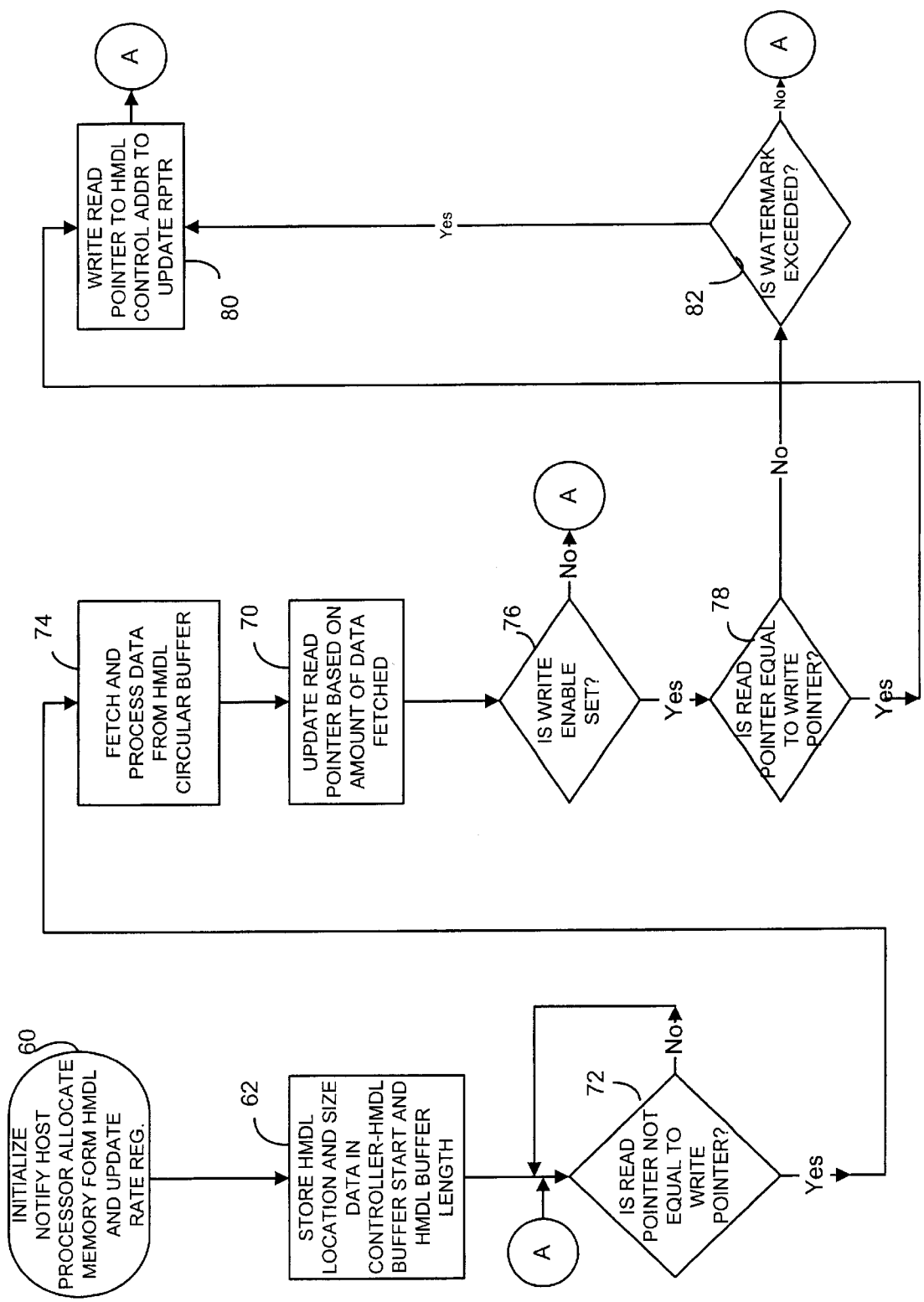
FIG. 3 is a more detailed flow diagram depicting one example of the operation of the graphics display command list handling process and host processor operation in accordance with one embodiment of the invention.

Referring to FIG. 3, a more detailed operational flowchart is shown. In block 72, after creation and the initialization of the circular host memory display list buffer 16, and the HMDL buffer start address and the HMDL buffer length data has been communicated to the processor 12 (block 62) the processor 12 determines whether the read pointer (RPTR) 54 is different from the write pointer (WPTR) 50. If they are not different, indicating that the next filled entry in the host memory display list is the same as the next available entry, the system waits until the pointer addresses are different. If the read pointer and the write pointer addresses are not the same, as shown in block 74, the processor 12 fetches and processes data from the HMDL circular buffer through the use of the command FIFO 20. The command FIFO 20 stores the display command data in entries 28 in sizes determined by the CPU based on the packet structure used by the host processor 10. As shown in block 76, the processor determines if the write enable bit has been set. If the write enable bit has been set, indicating that a write to the circular host memory HMDL buffer has been requested, the processor 12 determines if the read pointer 54 is equal to the write pointer 50 as shown in block 78. If they are equal, the processor 12 writes the read pointer 54 to the HMDL control address to update the read pointer as shown in block 80 As shown in block 82, the processor then determines the suitable course of action based on the plurality of watermarks.

In one embodiment, the requisite circular buffer status registers may include a buffer offset register which contains data serving as a pointer to the location of the ring buffer in system memory. In addition, another register may contain data representing the size of the ring buffer. The watermark buffer 33 may contain the plurality of watermarks such as three watermarks wherein if the write pointer address minus the read pointer address is less than a first watermark, then the processor 12 reads in entries when the command FIFO 20 contains less than a second watermark. Otherwise the processor reads in entries when the pretranslation command FIFO contains less than a number of free entries indicated by other bits in the watermark buffer. Another register or entry may contain data representing when the display list read pointer should be updated. This reflects where the programmable parser is in the HMDL.

From the host processor's point of view, the host processor determines whether graphics drawing operational codes are available. In other words, it determines whether a graphics driver or other driver is requesting that the graphics processor be used to generate graphics information for display on the display device. The host processor then allocates a required HMDL packet size and then initiates the HMDL packet data by filling the circular HMDL FIFO with command data. The host processor maintains memory read pointers and memory write pointers to know where the graphics processor is in its sequence of processing commands obtained from the HMDL ring. The read pointer 54 and write point 50 point to host memory locations.

The processors 10 and 12 may be a single processing entity or a plurality of processing entities. Such a processing entity may be a microprocessor, microcomputer, microcontroller, central processing unit, digital signal processor, state machine, logic circuitry, and/or any device that manipulates information based on operational instructions. The memory may be a single memory device or a plurality of memory devices. Such a memory device may be a read-only memory, random access memory, floppy disk memory, hard disk memory, system memory, reprogrammable memory, magnetic tape memory, DVD memory, and/or any device that stores digital information. Note that if the processors implement one or more of its functions using a state machine or logic circuitry, the memory containing the corresponding operational instructions is embedded within the circuitry that comprises the state machine and/or logic circuitry.

The graphics display command list handler and method provides, among other advantages, a concurrent command engine wherein a host processor or other processor can put commands in a rung buffer but does not need to poll the processor being commanded,, such as a graphics controller, to see whether the graphics controller needs commands. All that the host processor needs to know is how much room is left in the ring buffer. The graphics controller pulls commands from the ring buffer on its own without host processor monitoring.

It should be understood that the implementation of other variations and modifications of the invention in its various aspects will be apparent to those of ordinary skill in the art, and that the invention is not limited by the specific embodiments described. For example, the circular FIFO buffer need not be part of host memory but by be any suitable memory. It is therefore contemplated to cover by the present invention, any and all modifications, variations, or equivalents that fall within the spirit and scope of the basic underlying principles disclosed and claimed herein.

What is claimed is:

1. A graphics display command list handling process between a first processor and a second processor comprising the steps of:

requesting allocation of memory display list (MDL) as a circular host memory display list buffer;

storing memory display list location data and size data in first processor memory;

controlling, by the second processor, a memory display list write pointer indicating a next available entry in the MDL;

controlling, by the first processor, a memory display list read pointer indicating a next entry in the memory display list that is read by the first processor;

communicating the host memory display list read pointer to the second processor to facilitate display list signaling by the first processor; and updating the read pointer based on an amount of command data fetched by the first processor from the host memory display list.

2. The method of claim 1 including the step of determining, by the first processor, whether the difference in value between the write pointer and the read pointer is different than a first watermark value, and reading command data from the circular host memory display list buffer and storing the command data in a command FIFO memory, associated with the first processor, for use by the first processor.

3. The method of claim 1 including storing, by the first processor, the read pointer as data in a register.

4. The method of claim 1 including storing, by the second processor, the read pointer.

5. The method of claim 1 including the step of providing, for the first processor, a command block of memory containing the MDL location data.

6. The method of claim 1 including providing a programmable command data parser to facilitate parsing of differing graphics command packets and storing retrieved register address and data into a command FIFO memory for use by a graphics rendering engine.

7. The method of claim 1 including storing a plurality of programmable watermark values to facilitate in determining whether to pull ring buffer command data.

8. A graphics display command list handling process between a graphics processor and a host processor comprising the steps of:

requesting processor allocation of host memory display list (HMDL);

storing host memory display list location and size data in graphics processor memory;

controlling, by the host processor, a host memory display list write pointer indicating a next available entry in the HMDL;

controlling, by the graphics processor, a host memory display list read pointer indicating a next entry in the host memory display list that is read by the graphics processor;

communicating the host memory display list read pointer to the host processor to facilitate display list signaling by the graphics processor; and updating the read pointer based on an amount of command data fetched by the graphics processor from the HMDL.

9. The method of claim 8 including the step of determining, by the graphics processor, whether the difference in value between the write pointer and the read pointer is different than a first watermark value, and reading command data from the circular host memory display list buffer and storing the command data in a command FIFO memory, associated with the graphics processor, for use by the graphics processor.

10. The method of claim 9 including storing, by the graphics processor, the read pointer as data in a register.

11. The method of claim 10 including storing, by the host processor, the read pointer.

12. The method of claim 11 including providing a programmable command data parser to facilitate parsing of differing graphics command packets and storing retrieved register address and data into a command FIFO memory for use by a graphics rendering engine.

13. The method of claim 8 including the step of providing, for the graphics processor, an HDML buffer containing the HMDL location data.

14. The method of claim 8 including storing a plurality of programmable watermark values to facilitate in determining whether to pull command data.

15. A graphics display command list handler comprising:

a first processor operative to request a second processor to allocate circular buffer memory for memory display list and to store memory display list location data and size in graphics processor memory;

at least one memory element containing data representing a host memory display list write pointer including a next available entry in the memory display list;

at least one memory element containing data representing a memory display list read pointer indicating a next entry in the memory display list to be read by the first processor; and the first processor operative to communicate a copy of the memory display list read pointer to the second processor to facilitate display list signaling by the processor.

16. The handler of claim 15 wherein the processor is further operative to update the memory display list read pointer based on an amount of command data fetched by the processor from the memory display list.

17. The handler of claim 15 including memory containing a first watermark value and wherein the processor determines whether the difference in value between the memory display list write pointer and the memory display list read pointer is different than the first watermark value, and reads command data from the circular memory display list buffer and stores the command data in a command FIFO memory for use by the processor.

18. The handler of claim 15 including a programmable command data parser to facilitate parsing of differing graphics command packets and to facilitate storing of retrieved register address information and data into a command FIFO memory for use by a graphics rendering engine.

19. The handler of claim 15 including memory containing a plurality of programmable watermark values to facilitate in determining whether to pull ring buffer command data.

* * * * *